(12) United States Patent
Kashima et al.

(10) Patent No.: US 7,848,345 B2
(45) Date of Patent: Dec. 7, 2010

(54) COMMUNICATION NETWORK USING CODE DIVISION MULTIPLEXING TECHNOLOGY

(75) Inventors: Masayuki Kashima, Tokyo (JP); Kazuhiko Matsuno, Kanagawa (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 12/481,205

(22) Filed: Jun. 9, 2009

(65) Prior Publication Data

US 2009/0252496 A1    Oct. 8, 2009

Related U.S. Application Data

(62) Division of application No. 10/928,307, filed on Aug. 30, 2004, now Pat. No. 7,564,774.

(30) Foreign Application Priority Data

Aug. 29, 2003   (JP) ............... 2003-306279

(51) Int. Cl.
*H04B 7/216* (2006.01)
*H04B 1/00* (2006.01)

(52) U.S. Cl. ................. 370/441; 375/130

(58) Field of Classification Search ........ 370/203, 370/206–208, 400, 441; 375/130, 140, 145, 375/146
See application file for complete search history.

(56) References Cited

U.S. PATENT DOCUMENTS 5,265,119 A    11/1993   Gilhousen et al.
5,511,067 A    4/1996    Miller
5,940,379 A *  8/1999    Startup et al. ............... 370/320
6,091,717 A    7/2000    Honkasalo et al.
6,356,555 B1 * 3/2002    Rakib et al. ................. 370/441

(Continued)

FOREIGN PATENT DOCUMENTS

CN    1199298 A    11/1998

(Continued)

OTHER PUBLICATIONS

Office Action, Japanese Application No. 2003-306279 and English translation, Jul. 29, 2008.

(Continued)

*Primary Examiner*—Aung S Moe
*Assistant Examiner*—Kerri M Rose
(74) *Attorney, Agent, or Firm*—Rabin & Berdo, P.C.

(57) ABSTRACT

A communication network which can use communication bandwidth effectively. Spreading codes of a first and a second code length are assigned for every communication terminal interfaces connected to the same communication network. The spreading codes of the first code length are used for data communications. The spreading codes of the second code length are used for the control communications between the interfaces and the server. The interfaces and the server receives mixed signals of the data and the control signals. When the received signals are decoded using the spreading code of the first code length, control signal components became equal to or lower than the noise level. When the received signals are decoded using the spreading code of the second code length, data components became equal to or lower than the noise level. Therefore, the interfaces and the server can extract one of these signal components.

9 Claims, 10 Drawing Sheets

U.S. PATENT DOCUMENTS

| | | |
|---|---|---|
| 7,102,993 B2 | 9/2006 | Niwano et al. |
| 7,145,863 B2 | 12/2006 | Niwano et al. |
| 7,289,423 B2 | 10/2007 | Niwano et al. |
| 7,307,943 B2 | 12/2007 | Niwano et al. |
| 2003/0128747 A1 | 7/2003 | Poon et al. |
| 2008/0043680 A1* | 2/2008 | Fitton .................... 370/335 |
| 2008/0080363 A1* | 4/2008 | Black et al. ............ 370/209 |

FOREIGN PATENT DOCUMENTS

| | | |
|---|---|---|
| JP | 52-13367 | 4/1977 |
| JP | 2001-308723 | 11/2001 |
| JP | 2003-218738 | 7/2003 |
| WO | WO-03/065628 | 7/2003 |

OTHER PUBLICATIONS

"xDSL/FTTH handbook" Tetsuya Miki et al. (supervisors), ASCII Corp., Oct. 11, 1999, pp. 42-45.

"Optical Access Systems ATM-POM" Kiyoshi Yokota et al., Oki Electric Technical Review, No. 182, vol. 67, No. 1, Apr. 2000, pp. 19-22.

"Point Diagram Equations, Gigabit Ethernet TM handbook" 1st Edition, 2nd Version, ASCII Corp., May 1, 2000, oo. 53-107.

Xin Zhang et al, "Capture Technology of DS/CDMA-Based Wideband Spectrum Sequence," Electric Technology Practice and Usage, Jun. 30, 1999, pp. 54-56.

* cited by examiner

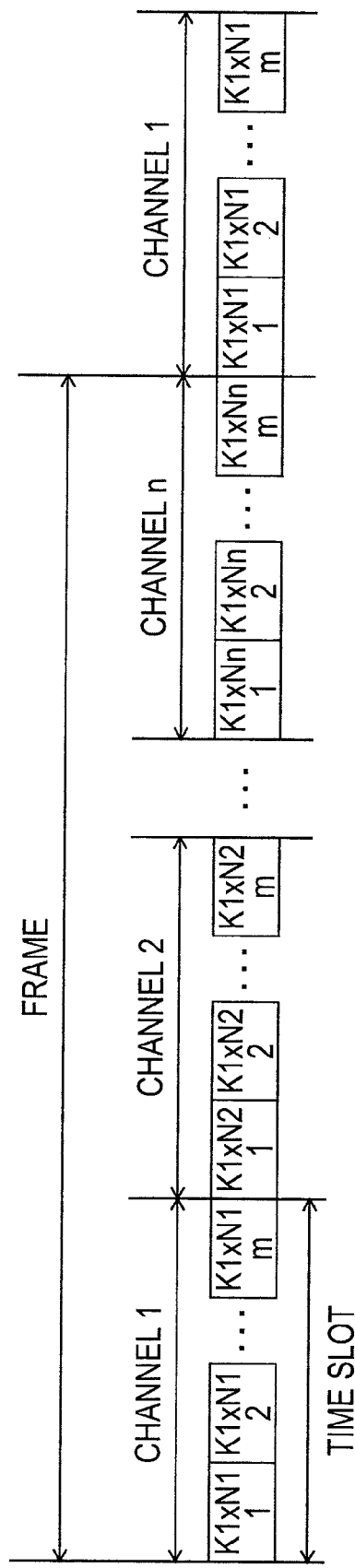

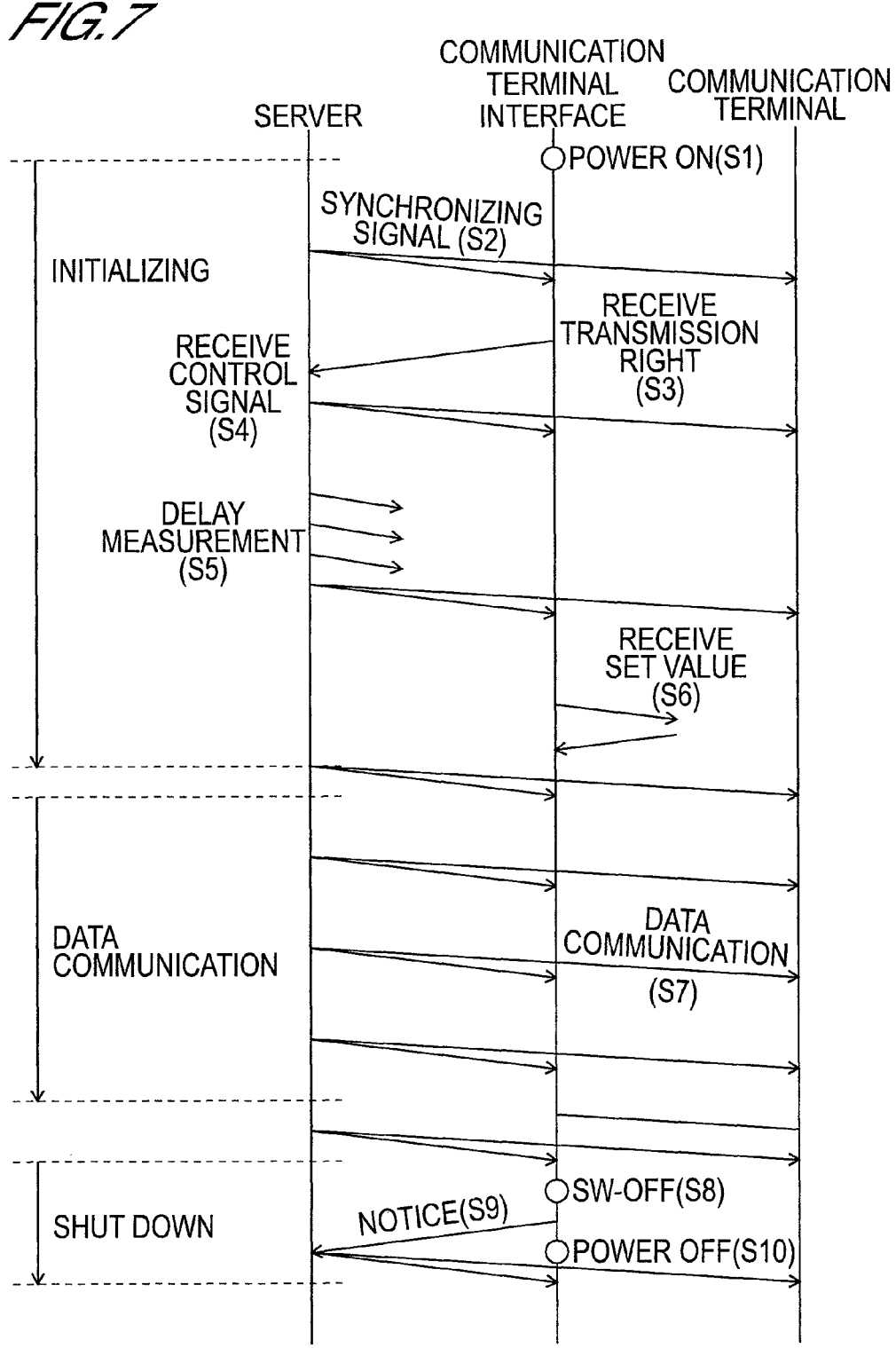

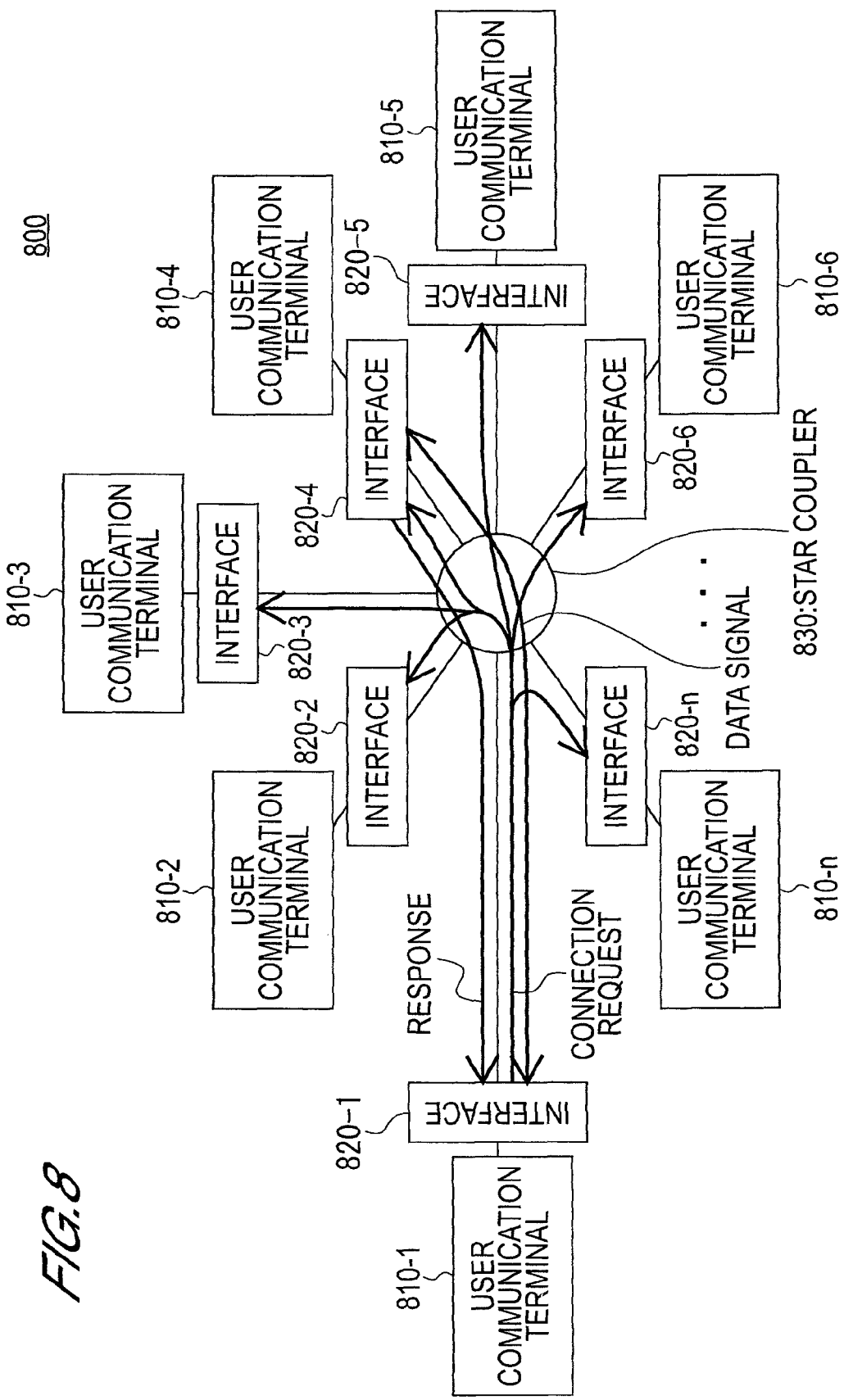

COMMUNICATION NETWORK USING CODE DIVISION MULTIPLEXING TECHNOLOGY

CROSS-REFERENCE TO RELATED APPLICATIONS

This application is a divisional of U.S. application Ser. No. 10/928,307 filed Aug. 30, 2004 which claims benefit to Japanese Application No. 2003-306279 filed Aug. 29, 2003.

BACKGROUND OF THE INVENTION

1. Field of the Invention

The present invention relates to a communication network using code division multiplexing technology. The present invention can be applied to a communication network which performs peer-to-peer communications, for example.

2. Description of Related Art

Conventionally, peer-to-peer communication is known as one mode of using the Internet and other similar networks. Peer-to-peer may also be written as "P2P", and is a communication system whereby information can be exchanged directly between a plurality of user communication terminals, via the Internet and other similar networks.

As is already known, technologies for connecting a user communication terminal to the Internet include, for example, ADSL (Asymmetrical Digital Subscriber Line), ATM-PON (Asynchronous Transfer Mode—Passive Optical Network), LAN (Local Area Network), or the like. The following references are amongst those which disclose communication technology of this kind.

(i) "xDSL/FTTH handbook", ASCII Corp., p. 42-p. 45

(ii) Kiyoshi Yokota, et. al., "Optical access systems", Oki Electric Technical Review, No. 182, Vol. 67, No. 1, April 2000, p. 19-p. 22

(iii) Yasuichiro Seto, ed., "Point diagram equations, Gigabit Ethernet™ handbook", $1^{st}$ Edition, $2^{nd}$ Version, ASCII Corp., $1^{st}$ May 2000, p. 53-p. 107

Peer-to-peer communication can be achieved by controlling packets by means of L2/L3 switches which use upper level layer. However, in a system for connecting a user communication terminal to a network, such as the Internet, by means of an ATM-PON or LAN system, as described above, one communication line is shared by a plurality of terminals. Therefore, it becomes necessary to guarantee bandwidth in order that P2P communication occupy a large communication capacity. In other words, if a plurality of communication channels are secured by bandwidth guarantee, P2P communication of large capacity become possible. However, in order to guarantee bandwidth, a new bandwidth guarantee control device is added, and/or the transmission capacity of the entire network must be increased, and the like. Therefore, the costs relating to the network architecture rise.

P2P communications can also be realized in a network using optical communication cables, by using optical wavelength division multiplexing technology. In this kind of network, P2P communication is achieved by adding a new wavelength channel for P2P communications. However, in this case, the components used in the optical wavelength division multiplexing are highly expensive, and so the costs relating to network architecture rise.

Moreover, high-capacity P2P communications can also be achieved by using code division multiplexing technology. However, in this case, bandwidth use efficiency becomes poor, due to the need for a channel for achieving synchronization between the terminals carrying out P2P communications. Therefore, the capacity of the communication circuit must be increased in order to secure a sufficient number of channels. For this reason, the costs relating to the network architecture rise.

SUMMARY OF THE INVENTION

An object of the present invention is to provide a technology which can raise a bandwidth use efficiency of a communication network using code division multiplexing.

(1) A communication network according to a first invention comprises: plural communication terminal interfaces, each of which has a first decoding circuit for decoding received data using a defusing code of a first code length and decoding received control signal using a defusing code of a second code length that is different from the first code length, and a first encoding circuit for encoding transmission data using a spreading code of the first code length and encoding transmission control signal using a spreading code of the second code length; a server which has a second decoding circuit for decoding received control signal using spreading codes of the second code length, and a second encoding circuit for encoding transmission control signal using spreading codes of the second code length; a communication circuit which connects the communication terminal interfaces and the server each other.

(2) A communication network according to a second invention comprises: plural communication terminal interfaces, each of which has a first decoding circuit for decoding a received data using a first defusing code that is decided for every communication terminal interfaces, a second decoding circuit for decoding a transmission control signal using a second spreading code that is common to each communication terminal interface, a packet control circuit for deciding a distinction whether the decoded signal is a data signal or a control signal, and an encoding circuit for encoding a data signal using the first spreading code and encoding a control signal using the second spreading code; a communication circuit which connects the communication terminal interfaces each other.

BRIEF DESCRIPTION OF THE DRAWINGS

Further objects and advantages of the present invention will be described with reference to the following attached drawings.

FIG. 4 is a conceptual diagram showing the structure of the timing control signals output from the communication server shown in FIGS. 1 and 2;

FIG. 7 is a sequence diagram for explaining the operation of the communication network relating to the first embodiment;

FIG. 8 is a conceptual diagram showing the constitution of a peer-to-peer communication network relating to a second embodiment;

DESCRIPTION OF THE PREFERRED EMBODIMENTS

Figure 1:
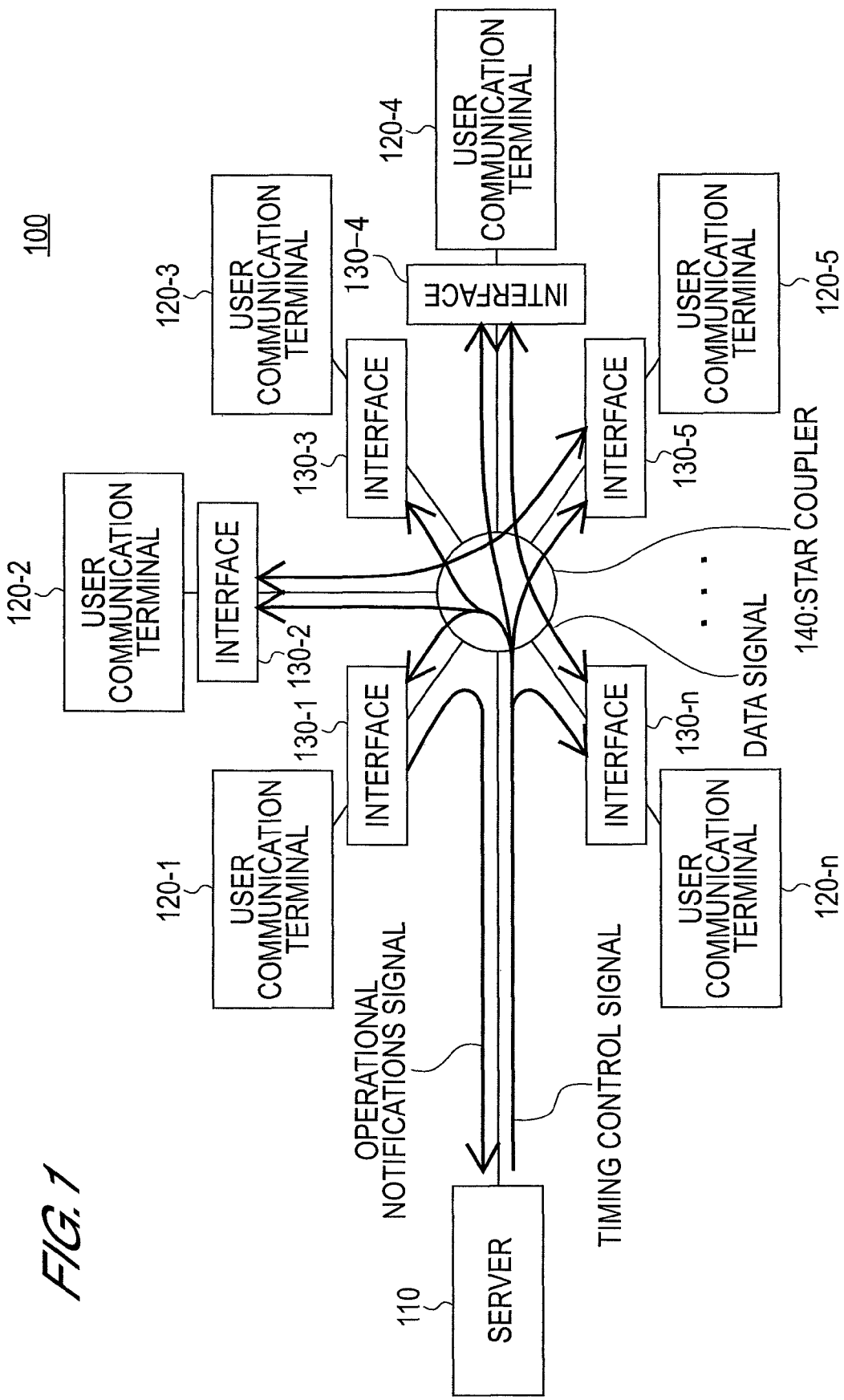
FIG. 1 is a conceptual diagram showing the constitution of a peer-to-peer communication network relating to a first embodiment.

Below, a mode of the present invention is described with reference to the drawings. In the drawings, the size and shape of each respective constituent element, and the positional relationships of same are displayed in merely an approximate fashion for the purpose of understanding the present invention, and furthermore, the numerical conditions stated in the following description are merely illustrative examples.

First Embodiment

A first embodiment of the present invention is described with reference to FIG. 1 to FIG. 7. The present invention is a example in which the present invention is applied to a LAN.

FIG. 1 is a general diagram showing an approximate view of the overall composition of a peer-to-peer communication system relating to the present embodiment. As shown in FIG. 1, the peer-to-peer communication system 100 according to the present embodiment comprises one server 110, a plurality of user communication terminals 120-1-120-n, a plurality of communication terminal interfaces 130-1-103-n, and one star coupler 140.

The server 110 is a management device for performing timing control for peer-to-peer communications. Accordingly, the server 110 encodes a timing control signal and outputs it constantly to all of the interfaces 130-1-130-n. In addition, the server 110 receives an encoded operational notifications signal from the interfaces 130-1-130-n. In this description, the timing control signal is a signal for adjusting the reception timing and the transmission timing of the respective communication terminal interfaces 130-1-130-n. The operational notifications signal is a signal indicating information relating to network management, such as problem information, and the like.

The communication terminals 120-1-120-n are communication terminals used by users, such as personal computers, or the like, for example. Peer-to-peer communications are carried out between any peers of these communication terminals 120-1-120-n.

The interfaces 130-1-130-n mediate communications to and from the corresponding communication terminals 120-1-120-n. When performing peer-to-peer communications, the interfaces 130-1-130-n encode the data output by the corresponding communication terminal, and transmit this data to the other interfaces, and they decode data received from the other interfaces and transmit this data to the corresponding communication terminal. In addition, the interfaces 130-1-130-n encode operational notifications signals and transmit these signals to the server 110. Furthermore, the interfaces 130-1-130-n each receive timing control signals from the server 110 and encode these signals. The encoded timing control signal is used for controlling the timing of the interfaces 130-1-130-n. The interfaces 130-1-130-n may also be incorporated inside the corresponding communication terminals 120-1-120-n.

The star coupler 140 is a coupler for connecting the server 110 and the communication terminal interfaces 130-1-130-n in a mutually communicable fashion. The star coupler 140 is connected to the server 110 and the interfaces 130-1-130-n by means of optical fibers.

In the system 100 according to the present embodiment, communication channels are set up using code division multiplexing technology. Generally, when a plurality of communication channels are set up using code division multiplexing, spreading codes of the same code length but different values are used for the respective communication channels. As a result, communication channels having the same degree of spread are established. In contrast to this, in the present embodiment, the degree of spreading for peer-to-peer communications and control communications is different. It is possible to increase the bandwidth use efficiency by establishing communication channels having different degrees of spreading in this way. As described below, in respective peer-to-peer communications, spreading codes of code length N and respectively different values are used. On the other hand, in control communications, spreading codes of code length N×K and mutually different values are used. N and K are natural numbers other than 1.

Figure 2:
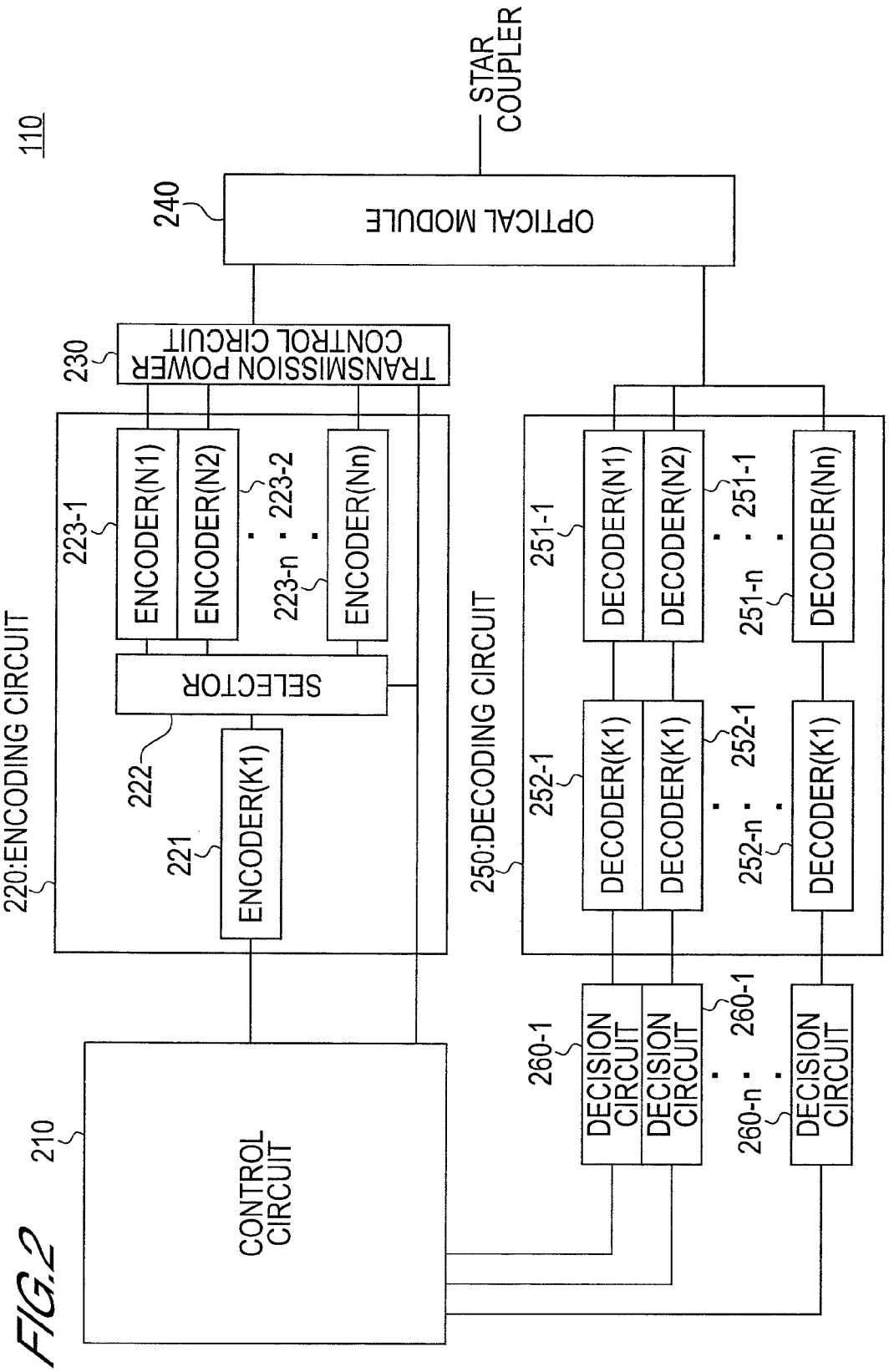
FIG. 2 is a block diagram that schematically shows the structure of the peer to peer communication server relating to the first embodiment.

FIG. 2 is a block diagram showing the internal composition of the server 110. As described above, the server 110 performs control communications with communication terminal interface 130-1-130-n. Spreading codes of N×K digits are used in the control communications.

As shown in FIG. 2, the server 110 comprises a control circuit 210, an encoding circuit 220, a transmission power control circuit 230, an optical module 240, a decoding circuit 250 and decision circuits 260-1-260-n.

The control circuit 210 performs timing control and management control for the system 100. For this purpose, the control circuit 210 generates timing control signals and sends these to the encoding circuit 220. In addition, the control circuit 210 receives operational notifications signals from the decision circuits 260-1-260-n. The details of the timing control signals are described later with reference to FIG. 4.

The encoding circuit 220 encodes the timing control signals input from the control circuit 210. The encoding circuit 220 comprises an encoder 221, a selector 222 and encoders 223-1-223-n. The encoder 221 encodes the timing control signals input from the control circuit 210, by using a spreading code K1 having K digits. The selector 222 sends the signal output by the encoder 221 to any one of the encoders 223-1-223-n. The encoders 223-1-223-n encode the signal input from the selector 222, by using spreading codes N1-Nn having N digits. The spreading codes N1-Nn used in the encoders 223-1-223-n all have the same number of digits. However, each of these spreading codes N1-Nn has a mutually different value. In this way, the encoding circuit 220 performs encoding using a spreading code of K digits, and encoding using a spreading code of N digits, with respect to the timing control signals. Therefore, the degree of spreading of the timing control signal is the same as if it were encoded by using a spreading code of K×N digits.

The transmission power control circuit 230 adjusts the power of the signals input from the encoders 223-1-223-n. As described above, the peer-to-peer communication data are encoded by using a spreading code which has N digits, and the control signals are encoded by using a spreading codes which has N×K digits. Therefore, the timing control signals have a greater degree of spreading than the peer-to-peer communication data. In code division multiplexing, the greater the degree of spreading, the lower the transmission power of signals. Taking this into account, the transmission power control circuit 230 adjusts the transmission power of the timing control signal, accordingly.

The optical module 240 converts the encoded timing control signals input from the power control circuit 220, from electrical signals into optical signals, and then outputs them to the star coupler 140 (see FIG. 1). In addition, the optical module 240 converts the operational notifications signals input from the star coupler 140, from optical signals into electrical signals, and outputs them to the decoding circuit 250.

The decoding circuit 250 decodes operational notifications signals input from the optical module 240. The operational notifications signals have been carried out an encode of K×N digits. The decoding circuit 250 comprises decoders 251-1-251-$n$, and 252-1-252-$n$. The decoders 251-1-251-$n$ decode the operational notifications signals by using spreading codes N1-Nn. The decoders 252-1-252-$n$ decode the output signals from the decoders 251-1-251-$n$, by using spreading code K1. The value of the spreading code N1-Nn and K1 used by the decoding circuit 250 are same as the value of the spreading code N1-Nn and K1 used by the encoding circuit 220 which is described above. By means of these decoders 251-1-251-$n$ and 252-1-252-$n$, it is possible to decode the operational notifications signals input from the optical module 240.

The decision circuits 260-1-260-$n$ decide the high-level or low-level state of the output signal from the decoding circuit 250. By this means, the operational notifications signals are converted into binary data. The operational notifications signals converted to binary data are sent to the control circuit 210.

Figure 3:
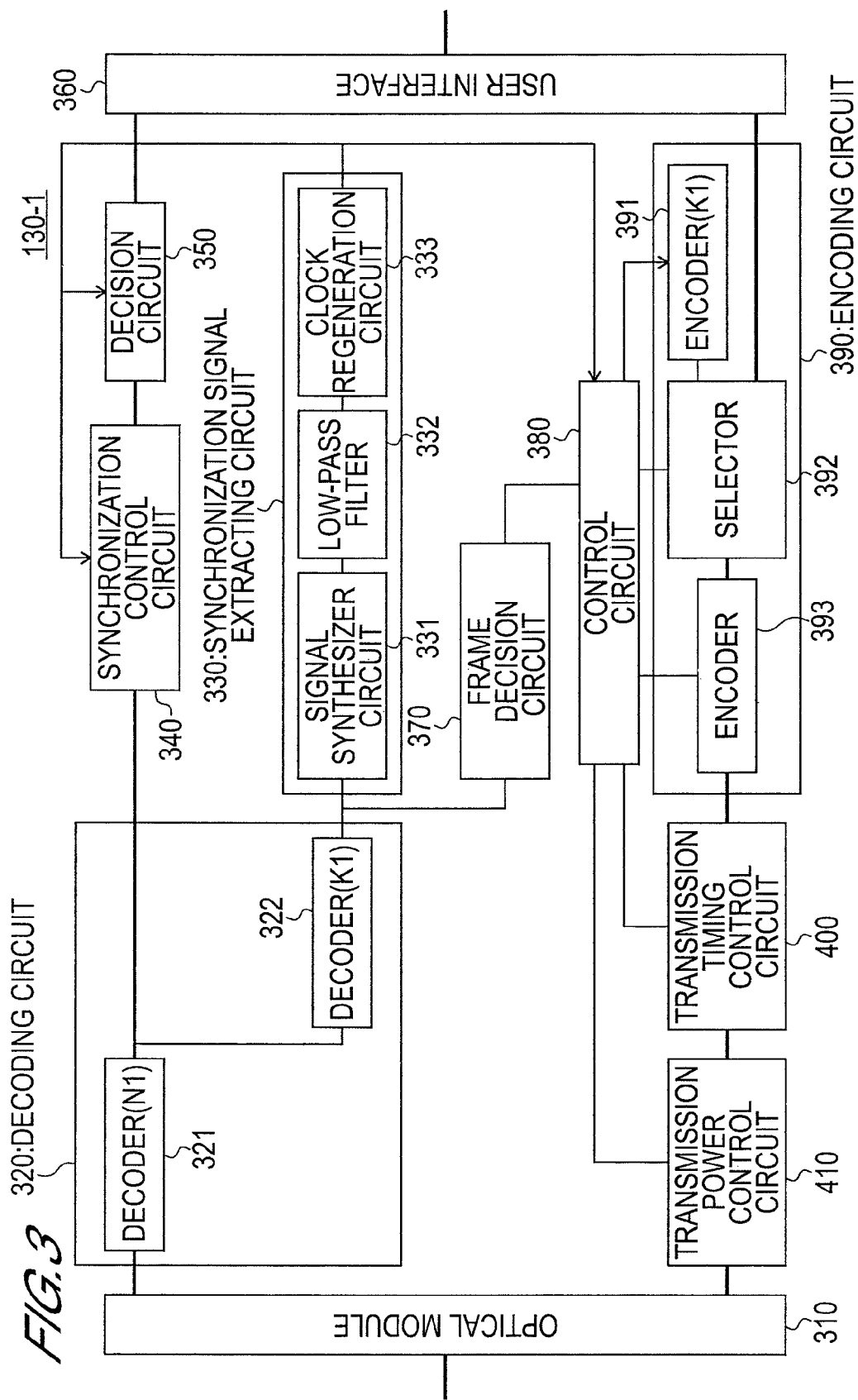
FIG. 3 is a block diagram that schematically shows the structure of the peer-to-peer communication terminal interface relating to the first embodiment.

FIG. 3 is a block diagram showing the internal composition of the communication terminal interface 130-1. All of the interfaces 130-1-130-$n$ have the same composition. However, the interfaces 130-1-130-$n$ use spreading codes of different values as their N-digit spreading codes, when decoding peer-to-peer communication data. The communication terminal interfaces 130-1-130-$n$ performs peer-to-peer communications with the other communication terminal interfaces, and they perform control communications with the server 110. As described above, an N-digit spreading code is used for peer-to-peer communications, and an N×K digit spreading code is used for control communications.

As shown in FIG. 3, the interfaces 130-1 comprise an optical module 130, an encoding circuit 320, a synchronization signal extracting circuit 330, a synchronization control circuit 340, a decision circuit 350, a user interface 360, a frame decision circuit 370, a control circuit 380, a encoding circuit 390, a transmission timing control circuit 400, and a transmission power control circuit 410.

The optical module 310 converts the peer-to-peer communication data and timing control signals input via the star coupler 140 (see FIG. 1), from optical signals to electrical signals, and it transmits the converted signals to the decoding circuit 320. In addition, the optical module 310 converts the peer-to-peer communication data and the operational notifications signals input from the transmission power control circuit 410, from electrical signals to optical signals, and it transmits converted signals to the star coupler 140.

The decoding circuit 320 decodes the peer-to-peer communication data and timing control signals input from the optical module 310. For this purpose, the decoding circuit 320 is provided with decoders 321 and 322. The decoder 321 performs decoding by using the spreading code N1. The decoder 322 decodes the output signal from the decoder 321 by using the spreading code K1. The value of the spreading code N1 and K1 used by the decoding circuit 320 are same as the value of the spreading code N1 and K1 used by the server 110. The operational principles of the decoding circuit 320 are described below, with reference to FIG. 5(A) and FIG. 5(B).

The synchronization signal extracting circuit 330 inputs the timing control signal decoded by the decoder 322, and extracts the synchronization timing. For this purpose, the synchronization signal extracting circuit 330 comprises a signal synthesizer circuit 331, a low-pass filter 332 and a clock regeneration circuit 333. The signal synthesizer circuit 331 outputs the absolute value of the amplitude of the signal input from the decoder 322, successively. The low-pass filter 332 removes high-frequency components from the output signal of the signal synthesizer circuit 331. The clock regeneration circuit 333 generates a clock that is synchronized to the output signal of the low-pass filter 332. The operational principles of the synchronization signal extracting circuit 330 are described hereinafter, with reference to FIG. 6(A) to FIG. 6(D).

The synchronization control circuit 340 reads out the output signal from the decoder 321 at the timing supplied by the output clock of the synchronization signal extracting circuit 330. The signals read by the synchronization control circuit 340 are sent to the decision circuit 350 successively.

The decision circuit 350 decides the high-level or low-level state of the signal input by the synchronization control circuit 340. By this means, the peer-to-peer communication data are converted into binary data. The peer-to-peer communication data converted to binary data are transmitted to the user interface 360.

The user interface 360 transmits the peer-to-peer communication data input from the decision circuit 350, to the communication terminal 120-1. Furthermore, the user interface 360 also sends the signal output by the communication terminal 120-1 (in other words, the peer-to-peer communication data, etc.) to the encoding circuit 390. 10/100 Base-T may be employed, for example, as the communication standard for the user interface 360.

A frame decision circuit 370 extracts the frame cycle and timing from the signal input from the decoder 322. The control signal transmission timing of the interface 130-1 is determined in accordance with this cycle and timing. The operational principle of the frame decision circuit 370 is described below with reference to FIG. 5(B).

The control circuit 380 controls the operation of the encoding circuit 390, the transmission timing control circuit 400 and the transmission power control circuit 410. For this purpose the control circuit 380 inputs timing signals from the synchronization signal extracting circuit 330, and it also inputs information on the frame cycle and timing, from the frame decision circuit 370. The control circuit 380 comprises a CPU (Central Processing Unit), a RAM (Random Access Memory), a ROM (Read Only Memory), and the like, which are not illustrated. The control circuit 380 controls these circuits 390, 400, 410, by executing a program stored internally. Furthermore, the control circuit 380 also generates operational notifications signals for transmitting to the server 110.

The encoding circuit 390 encodes the peer-to-peer communication data and the operational notifications signal. For this purpose, the encoding circuit 390 comprises an encoder 391, a selector 392, and an encoder 393. The encoder 391 encodes the operational notifications signals input from the control circuit 380, by using the spreading code K1. The selector 392 selects either the operational notifications signals input from the encoder 391 or the peer-to-peer communication data input from the user interface 360, and transmits either of there signals to the encoder 393 selectively. The encoder 393 encodes the signal input from the selector 392, by using any one of the spreading codes N1-Nn. Here, the encoder 393 uses the spreading code N1 when the selector 392 selects the operational notifications signal. On the other hand, the encoder 393 uses the spreading code which corresponds to the communication terminal interface of the reception side. For example, in the case where the reception side interface is the interface 130-2 (see FIG. 1), encoder 393 performs encoding by using spreading code N2. In this way, the peer-to-peer communication data can be encoded by using spreading codes of N digits, and the operational notifications signals can be encoded by using spreading codes of K×N digits.

The transmission timing control circuit 400 adjusts the sending timing of the data output from the encoder 393. The method for determining the sending timing is described below.

The transmission power control circuit 410 adjusts the signal power of the peer-to-peer communication data and the operational notifications signals. As described previously, the peer-to-peer communication data is encoded by using a spreading code having N digits, and the operational notifications signals are encoded by using a spreading code having N×K digits. In other words, the spreading code for the operational notifications signals have a greater number of digits than the spreading code for the peer-to-peer communication data. In code division multiplexing, the greater the number of digits in the spreading code, the lower the transmission power of signals. Taking this into account, the transmission power control circuit 410 adjusts the power of the peer-to-peer communication data and the operational notifications signals.

Next, the operation of the server 110 (see FIG. 2) will be described. Firstly, the transmission operation of the server 110 will be described with reference to FIG. 4. FIG. 4 is a conceptual diagram showing the structure of the timing control signals which are not encoded.

As illustrated in FIG. 4, control circuit 210 generates timing signals in frame units. One frame contains a plurality of time slots. In other words, the timing control signals are transmitted in a state which these signals are time division multiplexed. The first time slot stores a timing control signal addressed to the interface 130-1 (in other words, a timing control signal which corresponds to channel 1). The second time slot stores a timing control signal addressed to the interface 130-2 (in other words, a timing control signal which corresponds to channel 2). Similarly, the third to n-th time slots respectively store timing control signals addressed to interfaces 130-3-130-$n$ (in other words, timing control signals which correspond to channels 3-$n$).

The frame data are generated by control circuit 210 and sent to encoding circuit 220. the encoder 221 encodes the received frames in time slot units by using spreading code K1. the encoded time slots are assigned to the encoders 223-1-223-$n$. Consequently, first time slot is further encoded by encoder 223-1, second time slot is further encoded by encoder 223-2. Similarly third to n-th time slot are further encoded by encoder 223-3-223-$n$ respectively. Therefore, the frame data length m is K1×((D1×N1)+(D2×N2)+ . . . +(Dn×Nn)), when data lengths which correspond to the channel 1, 2, . . . , n are defined as D1, D2, . . . , Dn.

The timing control signals which are encoded in this way are given a power adjustment by transmission power control circuit 230 and converted to optical signals by the optical module 240. The timing control signals which are converted to the optical signals are transmitted to every interface 130-1-130-$n$ via star coupler 140.

Next, a reception operation in the server 110 is described.

The optical module 240 receives signals from the star coupler 140 and converts them to optical electrical signals. This signal does not comprise solely the operational notifications signals generated respectively by the interfaces 130-1-130-$n$, but also contains a mixture of peer-to-peer communication data transmitted between the respective interfaces 130-1-130-$n$. As described below, the interface 130-1 encodes the operational notifications signal by using the spreading code N1, and it then encodes it further by using spreading code K1, and then outputs it.

Furthermore, the interface 130-2 encodes the operational notifications signal by using the spreading code N2, and further encodes it by using spreading code K1, and then outputs it. In a similar fashion, the other interfaces 130-3-130-$n$ also encode their related operational notifications signals by using spreading code N3, N4, . . . , Nn, and further encode them by means of K1, and then output them.

The encoding circuit 250 separates out the operational notifications signals from this mixed signal. For this purpose, the mixed signal converted from an optical signal to an electrical signal by the optical module 240 is input to the decoders 251-1-251-$n$. The decoder 251-1 performs decoding using the spreading code N1, with respect to the mixed signal. By this way, only signals which corresponds to the channel 1 are separated from the mixed signals. The signals of channel 1 contains a operational notifications signal which is output from the interface 130-1 and peer-to-peer communication data which should be transmitted from the interfaces 130-2-130-$n$ to the interface 130-1. The decoder 252-1 further decodes this signal by using the spreading code K1. Therefore, the decoder 252-1 outputs an operational notifications signal that has been fully decoded. The reason over which the operational notifications signal can be separated is the same as the reason over which the timing control signal can be separated by the decoding circuit 320 of interface 130-1. This reason is described below by using FIG. 5(B). The decision circuit 260-1 restores the binary data, by deciding the high-level or low-level state of this signal. The restored binary data is sent to the control circuit 210, as a operational notifications signal of interface 130-1.

In a similar manner, the operational notifications signals of the interfaces 130-2-130-$n$ are also restored by means of the corresponding decoders and decision circuits, and are sent to the control circuit 210.

Next, the operation of the interface 130-1 will be described. The operation of the other interfaces 130-2-130-$n$ is similar to the operation of interface 130-1.

Firstly, the receiving operation in interface 130-1 will be described with reference to FIG. 5 and FIG. 6. Below, a case where peer-to-peer communications are conducted between the interface 130-1 and the interface 130-2 is described as an example. In this case, communication channel 1 is used for peer-to-peer communications from the interface 130-2 to the interface 130-1, and communication channel 2 is used for peer-to-peer communications from the interface 130-1 to the interface 130-2.

The optical module 310 (see FIG. 3) of the interface 130-1 receives a signal containing peer-to-peer communication data mixed with timing control signals. This peer-to-peer communication data does not only contain communication data from the interface 130-2 to the interface 130-1 (in other words, the communication data corresponding to communication channel 1), but also combines peer-to-peer communication data transmitted between other interfaces 130-3-130-$n$ (communication data corresponding to communication channels 3-$n$). Moreover, the time slots addressed to the other interfaces 130-2-130-$n$ are also mixed in with the timing control signals received by the interface 130-1 (see FIG. 4).

Figure 5A:
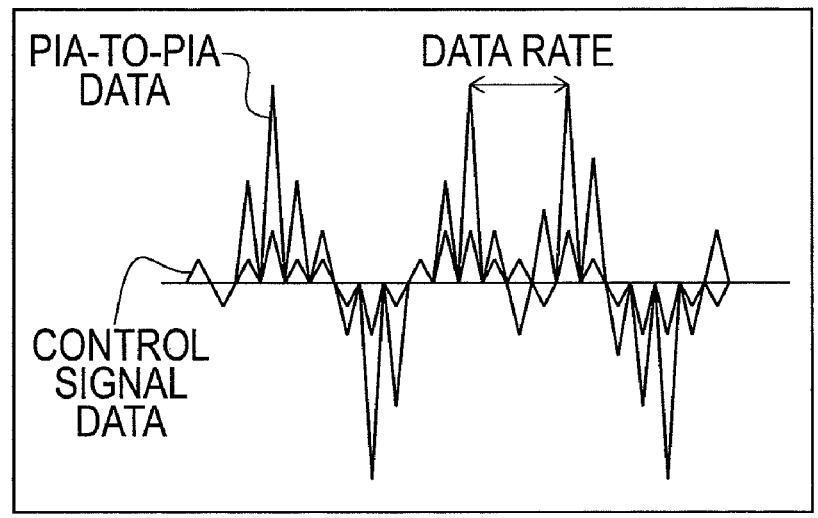
FIGS. 5(A) and 5(B) are conceptual diagrams for explaining the principle of code division multiplexing relating to the first embodiment.

The decoder 321 performs decoding of this mixed signal, using the spreading code N1. By this means, only the signal corresponding to the spreading code N1 is extracted from the mixed signal, and this extracted signal is decoded. In this example, the signal corresponding to the spreading code N1 is the signal received using communication channel 1. Moreover, the signal received via communication channel 1 comprises encoded peer-to-peer communication data send from the interface 130-2, and data stored in the first time slot of the encoded timing control signals send from the server 110. These signals are extracted from the mixed signal, and are decoded by using the spreading code N1. As described previously, the peer-to-peer communication data from the interface 130-2 has been encoded using the spreading code N1. On the other hand, the control signal data has been encoded using spreading code K1 and then further encoded using spreading code N1 (see FIG. 2). Consequently, the decoder 321 outputs fully decoded peer-to-peer communication data and control signal data that has been encoded by spreading code K1. FIG. 5(A) is a graph showing the results of an output waveform simulation for the decoder 321. As can be seen from FIG. 5(A), the peer-to-peer communication data is completely decoded, and the correlation peak is high. In contrast to this, the control signal data is spread by means of the spreading code K1 having K digits, and the correlation peak is low. Therefore, the subsequently positioned decision circuit 350 is able to treat the control signal data as noise, when deciding the high-level or low-level state of the peer-to-peer communication data. In other words, when deciding the peer-to-peer communication data, the timing control signal components can be ignored.

Figure 5B:
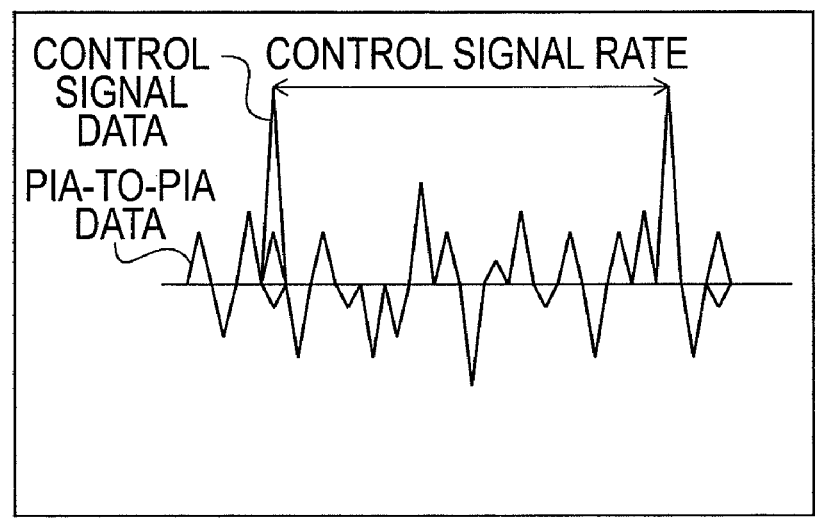
Figure 6A:
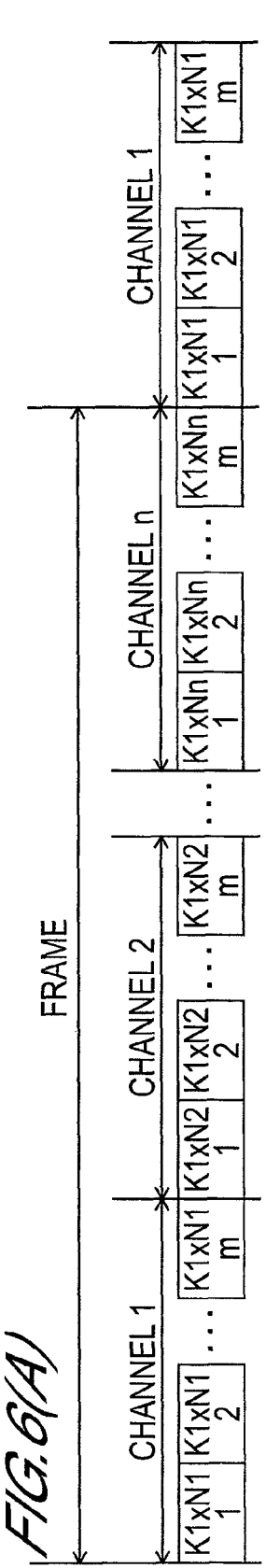
FIGS. 6(A), 6(B), 6(C) and 6(D) are conceptual diagrams for explaining the operation of the communication network relating to the first embodiment.
Figure 6B:
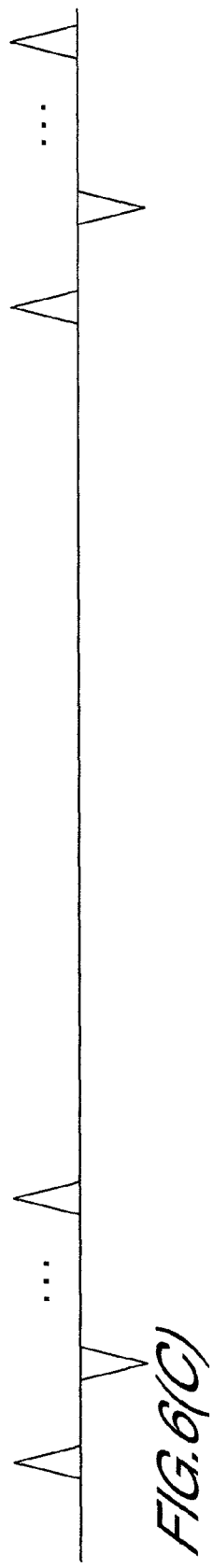
Figure 6C:
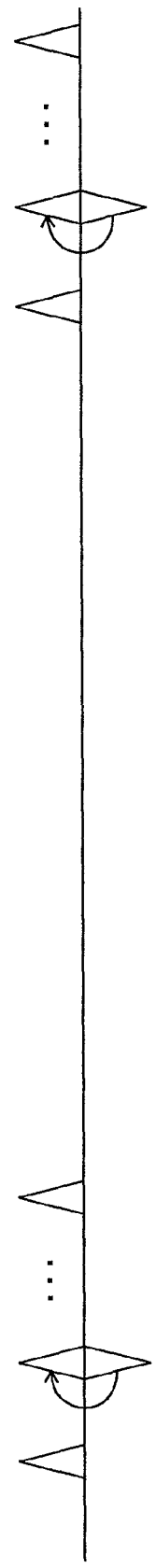
Figure 6D:
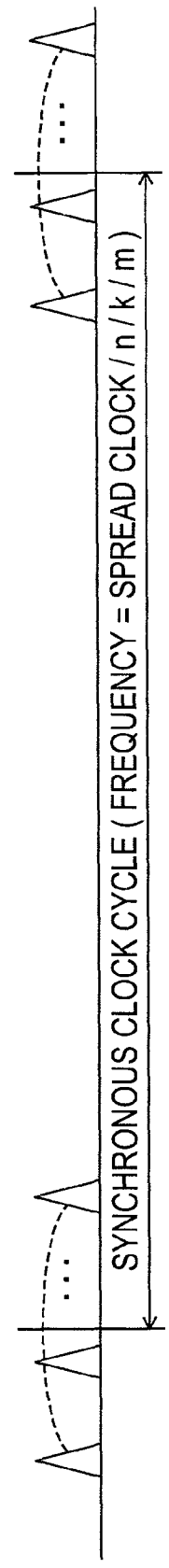

The output from the decoder 321 is supplied to the decoder 322. The decoder 322 decodes the output from the decoder 321, by using the spreading code K1. As described previously, the output signal from the decoder 321 comprises non-encoded peer-to-peer communication data, and a time slot encoded by using spreading code K1. Therefore, the output signal from the decoder 322 is a mixed signal containing peer-to-peer communication data encoded by using the spreading code K1 and control signal data that has been fully decoded. FIG. 5(B) is a graph showing the results of an output signal waveform simulation for the decoder 322. As can be seen from FIG. 5(B), the control signal data is fully decoded, and hence the correlation peak thereof is high. By contrast, the peer-to-peer communication data is a signal spread out by the spreading code K1, and hence the correlation peak is low. Consequently, the subsequently positioned synchronization signal extracting circuit 330 is able to treat the peer-to-peer communication data as noise. More specifically, the timing control signal slot can be obtained by that the low-pass filter 332 removes the noise component from the mixed signal output by the decoder 331.

The following relationships are established between the peer-to-peer communication data encoded by using the spreading code N1 and the timing control signal encoded by using the spreading codes K1 and N1. In the Equation (1) to (3), CCD [Mbps] indicates a tip rate of data which are encoded by using the any of the spreading code N1-Nn, DDR [Mbps] indicates a data rate of such data, PD indicates a power of such data. Additionally, CCKR [Mbps] indicates a tip rate of data which are encoded by using the any of the spreading code K1×N1–K1×Nn, CCNR [Mbps] indicates a data rate of such data, PC indicates a power of such data.

$$CDR = CCNR \quad (1)$$

$$DDR = CCKR \quad (2)$$

$$PC = \frac{PD}{K} \quad (3)$$

As indicated in Equation (1), the chip rate of data communications and the chip rate of control communications are the same. As indicated in Equation (2), the chip rate for data communications and the chip rate corresponding to the spreading code K1 of the control signal are the same. Moreover, as indicated in Equation (3), the transmission power of the control signal is 1/K times the transmission power for the data signal. By satisfying these equations (1) to (3), it is possible to transmit control signal at extremely low power compared to data communications. As a result, it is possible to transmit control signals in such a manner that they do not affect the encoding of data communications.

For example, if it is sought to achieve a value of 20 dB or above for the ratio between the auto-correlation peak of the peer-to-peer communication data and the auto-correlation peak of the timing control signal, in other words, the S/N ratio, when the timing control signal is regarded as noise, then the following equation (4) must be established. In the equation (4), Pd indicates the auto-correlation peak of the communication data, Pc indicates the auto-correlation peak of the control signal, and 1/M indicates the ratio of transmission power between the control signal and the data.

$$Pd/Pc/M > 100 \quad (4)$$

In this case, the transmission power of the control signal and the code length of each code is shown by equations (5-1) and (5-2). In the equations (5-1) and (5-2), N indicates stage number of registers for generating codes of data signals. In these equations, N is an odd number. For example, in the case where N is 7, the code length of the peer-to-peer communication data is 127. Therefore, in the case where the transmission power of the timing control signal is 1/16, the S/N ratio is 20 dB. In this case, the timing control signal is need to spreaded by using the code of 127×31 chips.

$$Pd = \text{Code length} = 2^N - 1 \quad (5-1)$$

$$Pc = 2^{((N+1)/2)} + 1 \quad (5-2)$$

For this reason, when the S/N ratio is desired to established to 20 dB, the transmission power of the timing control signal is established to 1/16, against that the transmission power of the peer-to-peer communication data is 1. Such transmission power is different according as a used spreading code.

The timing control signals which are decoded by the decoder 322 are sent to the synchronization signal extraction circuit 330 and the frame Decision circuit 370.

The frame decision circuit 370 decides the frame cycle and timing of the timing control signal by detecting the correlation peak as illustrated in FIG. 5(B).

FIG. 6 is a conceptual diagram for describing the operation of the synchronization signal extracting circuit 330. FIG. 6(A) is the same as FIG. 4. FIG. 6(B) is a simplified view of FIG. 5(B). As can be seen from FIGS. 6(A) and 6(B), the respective data inside the first time slot form a positive correlation peak or a negative correlation peak. The signal synthesizing circuit 331 turns these correlation peaks into absolute values, as illustrated in FIG. 6(C). By this means, the values of the correlation peaks become positive. Moreover, the low-pass filter 332 removes the high-frequency components from the output of the signal synthesizing circuit 331. Thereby, normal signal noise, and the aforementioned peer-to-peer communication data component are removed. Subsequently, the clock regenerating circuit 333 regenerates a clock synchronized with the output signal of the low-pass filter 332. As shown in FIG. 6(D), the cycle at which prescribed data is received within the first time slot coincides with the frame cycle of the timing control signal. The clock regenerating circuit 333 generates a timing clock corresponding to the respective data elements in the time slot, by dividing up the frame cycle. The division of the frame cycle is achieved by using a VCO (Voltage Controlled Oscillator), or a PLL (Phase Locked Loop) circuit, or the like, for example.

The timing clock generated in this way is supplied to the synchronization control circuit 340, the decision circuit 350, and the control circuit 380. The synchronization control circuit 340 determines the timing at which the output signal value from the decoder 321 is to be extracted, on the basis of this timing clock. The decision circuit 350 determines the timing at which the aforementioned decision is to be carried out, on the basis of this timing clock. Furthermore, the timing clock supplied to the control circuit 380 is used to establish the transmission timing.

Next, a transmission operation of the interface 130-1 is described. As mentioned above, the interface 130-1 outputs peer-to-peer communication data and an operational notifications signal.

When transmitting peer-to-peer communication data, firstly, the communication data is sent from the user communication terminal 120-1 (see FIG. 1) to the user interface 360. The selector 392 in the encoding circuit 390 selects the input data from the user interface 360, on the basis of the control implemented by the control circuit 380. Thereby, the encoder 393 encodes this communication data, by using a spreading code. In the case where the peer-to-peer communication data are transmitted to the communication terminal interface 130-2, spreading code N2 is used. The encoded data is sent to the transmission timing control circuit 400.

When transmitting an operational notifications signal, firstly, the control circuit 380 generates an operational notifications signal. This operational notifications signal is sent to the encoder 391. The encoder 391 encodes the operational notifications signal by using the spreading code K1. The selector 392 selects the input from the encoder 391, on the basis of the control implemented by the control circuit 380. Thereby, the signal output from the encoder 391 is input to the encoder 393. The encoder 393 then encodes the input signal, by using the spreading code. The spreading code N1 is used for encoding of the operational notifications signal transmitted from the communication terminal interface 130-1. The operational notifications signal thus encoded is then sent to the transmission timing control circuit 400.

The transmission timing control circuit 400 controls the output timing of the encoded communication data, in accordance with the setting in the control circuit 380. The control circuit 380 determines the signal output timing of the transmission timing control circuit 400, by using the output signal from the frame decision circuit 370, and the timing clock output by the synchronization signal extracting circuit 330. The timing for transmitting the peer-to-peer communication data is given from the timing clock of the synchronization signal extraction circuit 330. The timing for transmitting an operational notifications signal is given from the timing clock of the circuit 330 and 370.

The transmission power control circuit 410 adjusts the output power according to whether the output-signal is a peer-to-peer communication data or an operational notifications signal. The adjusted signal is then converted into an optical signal by the optical module 310, and then sent to the star coupler 140 (see FIG. 1).

Next, the overall operation of the peer-to-peer communication system 100 will be described with reference to the conceptual diagram in FIG. 7.

In the initial state, it is assumed that a power supply is not switched on to both the server 110 and the interface 130-2. The server 110 transmits a timing control signal (see FIG. 4) to all of the interfaces, regardless of whether or not their power supplies are switched on.

If the power supply of the communication terminal interface 130-1 is switched on (see step S1 in FIG. 7), then the interface 130-1 starts an initialization mode operation.

The interface 130-1 in initialization mode receives the timing control signal output by the server 110 (see step S2 in FIG. 7). As described previously, the interface 130-1 generates a timing clock using the synchronization signal extracting circuit 330. In this way, the interface 130-1 obtains the control signal data addressed to it, from the timing control signal. By obtaining this control signal data, the interface 130-1 secures the right to transmit (see step S3 in FIG. 7).

When the interface 130-1 has secured transmission rights in this way, it transmits the operational notifications signal to the server 110, by means of the procedure described above. The server 110 obtains the operational notifications signal by means of the procedure described above and captures it into the control circuit 210 (see step S4 in FIG. 7).

The server 110 detects the delay time in the interface 130-1, on the basis of the response time from transmission of the timing control signal until reception of the operational notifications signal (see step S5 in FIG. 7). Communications between all of the interfaces 130-1-130-$n$ and the server 110 share a common path between the star coupler 140 and the server 110. Therefore, the difference between the response times relating to each of the interfaces 130-1-130-$n$ corresponds to the difference in the delay times in the paths linking the star coupler 140 with the interfaces 130-1-130-$n$. Therefore, the server 110 is able to detect the relative delay time of the interface 130-1 from a comparison of the respective response times. The server 110 transmits information relating to the delay time, to the interface 130-1, by means of the timing control signal. The control circuit 380 in the interface 130-1 adjusts the transmission timing of the transmission timing control circuit 400, on the basis of this delay time. In this way, synchronization of the interface 130-1 is established (see step S6 in FIG. 7).

When synchronization is established, peer-to-peer communications can be conducted between the interface 130-1 and the other interface (in this case, interface 130-2).

Peer-to-peer communications are conducted between the interfaces 130-1, 130-2, whilst achieving synchronization on the basis of the timing control signals output by the server 110 (see step S7 in FIG. 7).

If the interface 130-1 becomes disconnected from the network, then firstly, the operational mode of the interface 130-1 is changed to shut down mode (see step S8 in FIG. 7). When the interface transfers to shut down mode, the interface 130-1 sends an operational notifications signal for indicating a communication disconnection, to the server 110 (see step S9 in FIG. 7). Thereupon, when the power supply to the interface 130-1 is switched off, the interface 130-1 ceases to respond to the timing control signal (see step S10 in FIG. 7). By this means, the server 110 confirms that the power supply of the interface 130-1 is has been switched off.

According to the present embodiment, since the control signal is encoded by using a spreading code of longer code length than that of the peer-to-peer communication data. Therefore, since the bandwidth use efficiency is increased, network costs are reduced.

In the present embodiment, the control communications spreading code N1×K1–Nn×K1 is made by carrying out the multiplication of K1 to the peer-to-peer communications spreading code N1–Nn. However, it is possible to make the control communications spreading code and the peer-to-peer communications spreading code independently.

Furthermore, according to the present invention, spreading codes which have shorter code length are used for the peer-to-peer communications and spreading codes which have longer code length are used for the control communications, however it is possible to use longer length spreading code for the peer-to-peer communications and shorter length spreading code for the control communications.

Second Embodiment

Figure 9:
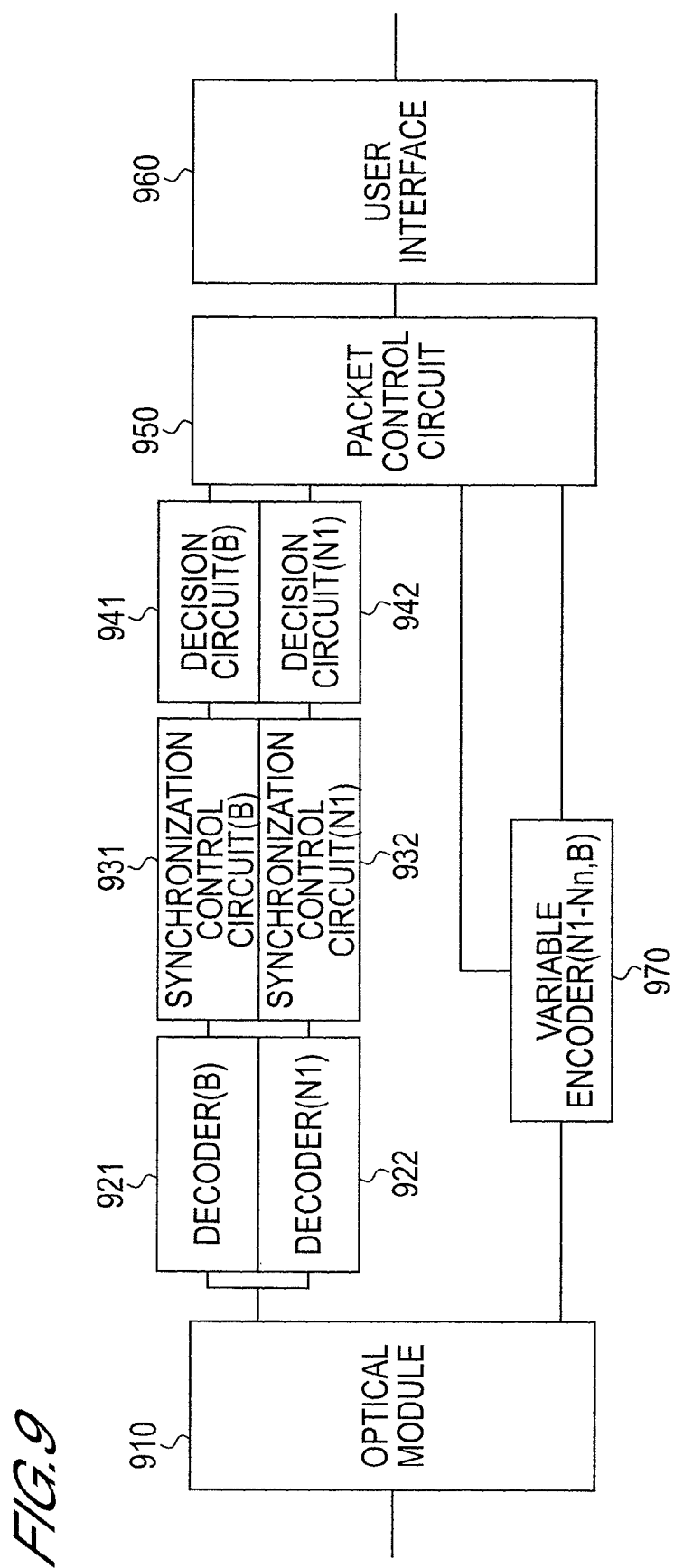
FIG. 9 is a block diagram that schematically shows the structure of the peer-to-peer communication server relating to the second embodiment.
Figure 10:
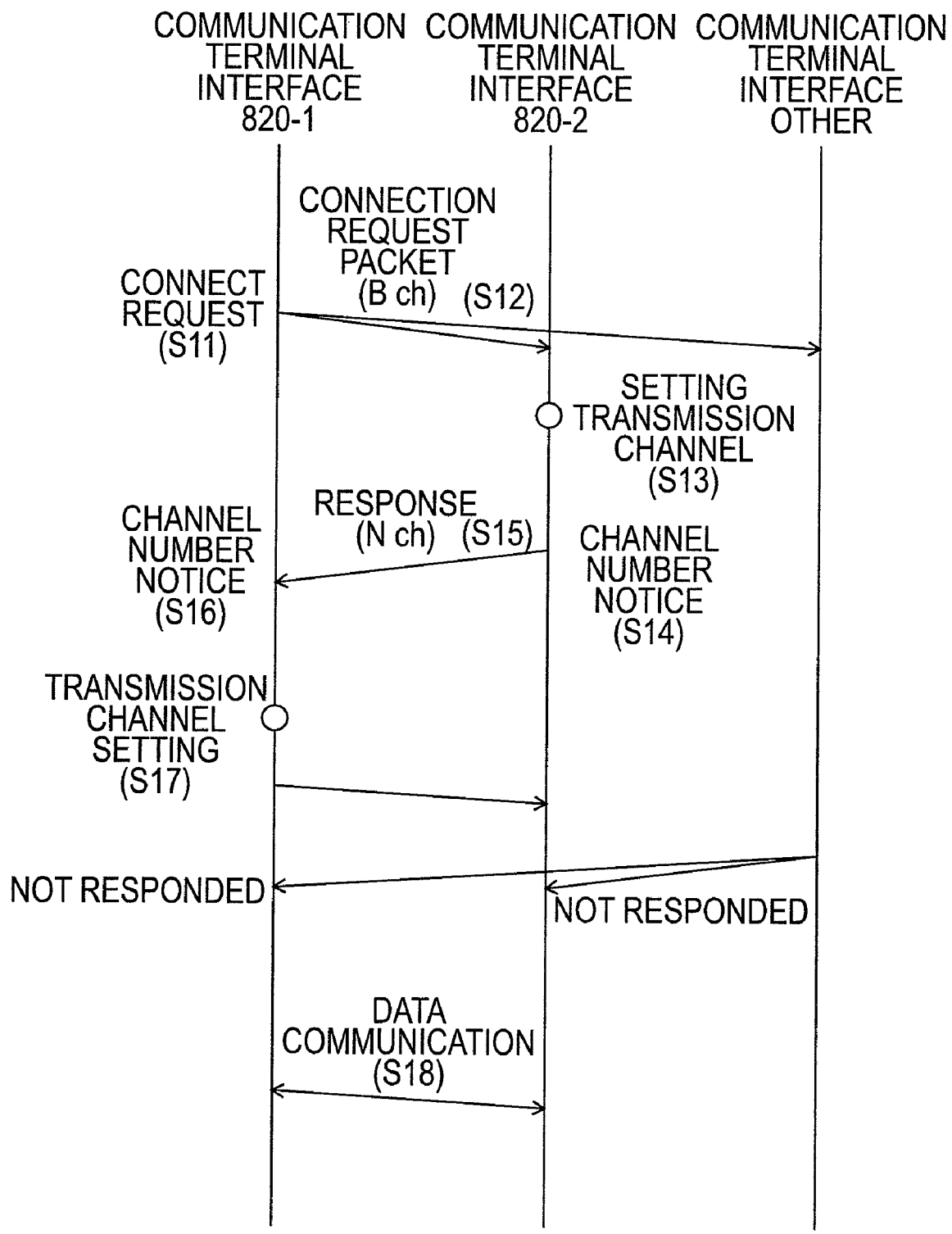
FIG. 10 is a sequence diagram for explaining the operation of the communication network relating to the second embodiment.

Next, a second embodiment of the present invention is described by using FIG. 8 to FIG. 10. The present invention is a example in which the present invention is applied to a LAN.

The network 800 relating to the present embodiment transmits connection request between the peer-to-peer communication interfaces, by using broadcast communication technology.

FIG. 8 is a conceptual diagram showing an approximate view of the general composition of a peer-to-peer communication network relating to the present embodiment. As shown in FIG. 8, the peer-to-peer communications network 800 according to the present embodiment comprises a plurality of user communication terminals 810-1-810-n, a plurality of peer-to-peer communication interfaces 820-1-820-n, and one star coupler 830. The network 800 according to the present embodiment does not comprise a server.

The communication terminals 810-1-810-n are communication terminals used by users, and are constituted by personal computers, for example. Peer-to-peer communications are conducted between any pair of these communication terminals 810-1-810-n.

The communication terminal interfaces 820-1-820-n mediate communications with the communication terminals 810-1-810-n. In the case of peer-to-peer communications, the interfaces 820-1-820-n encode the data output by their corresponding communication terminal, and transmit them to the other communication terminal interfaces, and they also decode data received from other communication terminal interfaces and send them to their corresponding communication terminal. In addition, the interfaces 820-1-820-n perform broadcast communications, as described hereinafter, with the other interfaces. The interfaces 820-1-820-n may also be incorporated inside the corresponding communication terminals 120-1-120-n.

The star coupler 830 is a coupler for connecting the communication terminals 810-1-810-n in a mutually communicable fashion. The star coupler 830 is connected to the interfaces 820-1-820-n by means of optical fibers.

FIG. 9 is a block diagram giving an approximate view of the internal composition of the interface 820-1. The internal compositions of the other interfaces 820-2-820-n are similar to that of the interface 820-1. As shown in FIG. 9, the interface 820-1 comprises an optical module 910, decoders 921, 922, synchronization control circuits 931, 932, decision circuits 941, 942, a packet control circuit 950, a user interface 960 and a variable encoder 970.

The optical module 910 converts the peer-to-peer communication data and the broadcast communication signal input from the star coupler 830 (see FIG. 8), from an optical signal into an electrical signal, and sends same to the decoders 921, 922. Furthermore, the optical module 910 also converts the peer-to-peer communication data and broadcast communication signal input from the variable encoder 970, from an electrical signal into an optical signal, and sends same to the star coupler 930.

The decoder 921 performs decoding using the spreading code B.

Similarly, the decoder 922 performs decoding using the spreading code N.

The synchronization control circuit 931 inputs signals decoded by decoder 921, at the timings which are given by output clocks of the synchronization signal extraction circuit not shown in figures. Input signals are sent to the decision circuit 941, continuously.

Similarly, the synchronization control circuit 932 inputs signals decoded by decoder 922, at the timings which are given by output clocks of the synchronization signal extraction circuit not shown in figures. Input signals are sent to the decision circuit 942, continuously.

The decision circuit 941 decides whether an input signal from synchronization control signal 931 is high level or low revel. In this way, received data is converted to a binary data. The data converted to a binary data is sent to the packet control circuit 950.

Similarly, the decision circuit 942 decides whether an input signal from synchronization control signal 932 is high level or low revel. In this way, received data is converted to a binary data. The data converted to a binary data is sent to the packet control circuit 950.

The packet control circuit 950 inputs binary data from decision circuit 941 and 942 respectively. Moreover, the packet control circuit 950 decides whether the received data is a broadcast communication data (that is, connection request signal) or a peer-to-peer communication data. When the received data is a broadcast communication data addressed to it, the packet control circuit 950 is makes a response packet and send it to the variable encoder 970. The information whether the connection is permission or refusal is stored in the response packet. In addition, when the received data is a broadcast communication data addressed to it, the packet control circuit 950 sends the spreading code which corresponds to the communication terminal interface of performing this connection request. Similarly to the first embodiment described above, the communication terminal interfaces 820-1-820-n use anyone of the communication channels 1-n. The communications of the communication channel 1-n use the spreading code N1-Nn. When the received data is a connection request not addressed to it, the packet control circuit 950 performs no process. On the other hand, the received data is peer-to-peer data, the packet control circuit 950 send to the user interface 960 only the binary data input from the decision circuit 942. Additionally, the packet control circuit 950 makes a communication packet in which a connection request is stored, when the corresponding communication terminal 810-1 requests a connection to anyone of other communication terminals 810-2-810-n. This connection request information contains a user information which is received from the communication terminal 810-1 via user interface 960 and the information of the spreading code which corresponds to the communication channel of the communication terminal interface 820-1. Furthermore, the packet control circuit 950 commands the variable encoder 970 to change used spreading code to the value for broadcast communication.

The user interface 960 sends the binary data input from the decision circuit to the communication terminal 120-1. In addition, the user interface 960 sends the signals output by the communication terminal 120-1 to the variable encoder 970.

The variable encoder 970 encodes the communication packet input from the packet control circuit 950, and sends it to the optical module 910. As described above, used spreading code in this encoding is changed based on a control of the packet control circuit. The communication terminal interface of the present embodiment comprises one variable encoder, however it is possible to comprise encoders which can use only one spreading code, of with the same number as a number of spreading codes.

Next, the whole operation of the communication network 800 according to the present embodiment will be described by using FIG. 10. Hereinafter, an example of a case where a communication terminal 810-1 performs a connection request to a communication terminal 810-4 are taken.

Firstly, communication terminal 810-1 requests to the communication terminal interface 820-1 a connection toward a communication terminal 810-4 (see, step S11 in FIG. 10). This connection request contains a user information.

As described above, packet control circuit 950 in communication terminal interface 820-1 (see FIG. 9) receives this connection request through the user interface 960. Moreover, the packet control circuit 950 makes a communication packet in which connection request information is stored, with using this user information. The communication terminal in which the connection is requested is decided using this user information. This communication packet is transmitted to the variable encoder 970. Additionally, the spreading code in accordance with the broadcast communication is designated by the packet control circuit 950. Variable encoder 970 encodes this communication packet using the spreading code designated by the packet control circuit 950. the encoded communication packet is transformed to an optical signal by the optical module 910. Moreover, this communication packet is output from the communication terminal interface 820-1 using a communication channel for broadcast communication. In the case where a communication channel for a broadcast communication is used, a communication packet is transmitted to all of other communication terminal interfaces 820-2 to 820-$n$ through the star coupler 840. (see step S12 in FIG. 10).

Optical modules 910 of other communication interface 820-1 to 820-$n$ (see FIG. 9) transform this communication packet to electrical signals. Furthermore, this communication packet is, as described above, decoded by decoder 921 and 922, taken synchronization by synchronization control circuit 931 and 932, moreover convert to binary data by the decision circuit 941 and 942. In the case where the this communication packet is a connection request to it (820-4), the packet control circuit 950 makes a response packet and transmits it to the variable encoder 970, as described above. Additionally, in the case where the received data is a broadcast communication signal addressed to it, the packet control circuit 950 decides the communication channel which should be used based on the transmitter of this connection request (see step S13 in FIG. 10). In this explanation, connection request is performed by the communication terminal interface 820-1, so the communication channel 1 is used, therefore the spreading code N1 is used. The packet control circuit 950 transmits this spreading code N1 to the variable encoder 970 (see step S14 in FIG. 10). In the case where the communication terminal interface 820-1 permits a connection to the communication terminal interface 820-4, an information indicating a permission of connection is stored in the response packet. When the communication terminal interface 820-1 is connected to other communication terminal interface, an information indicating a refusal of connection is stored in the response packet. In the case where the received data is a connection request addressed to a communication terminal interface except for it (820-4), the packet control circuit 950 performs no process, therefore a transmission of response packet does not performed (see step S19 in FIG. 10).

The variable encoder 970 encodes a communication packet using the spreading code N1 input from the packet control circuit 950. The encoded communication packet are transmitted from optical module 910 to the star coupler 830 (see FIG. 8). This communication packet is transmitted the communication terminal interface 820-1 through the communication channel 1 (see step S15 in FIG. 10). In this way, according to the present embodiment, a connection request packet is communicated using a broadcast communication, but the response packet corresponding to this connection request is communicated using one of the communication channel 1 to $n$.

Optical module 910 in the communication terminal interface 820-1 transforms the received response packet to electrical signals. Furthermore, this communication packet is, as described above, decoded by decoder 921 and 922, taken synchronization by synchronization control circuit 931 and 932, moreover convert to binary data by the decision circuit 941 and 942. the packet control circuit 950 decides that this communication packet is a response packet received trough the communication channel 1 (see step S16 in FIG. 10). In addition, the packet control circuit 950 commands the valuable encoder 970 to change the spreading code. In this description, the spreading code N4 is used because the communication companion is the communication terminal interface 820-4. The variable encoder 970 is establishes the spreading code to N4 following the command of the packet control circuit 950 (see step S17 in FIG. 10).

By performing these steps, a connection between the communication terminal interface 820-1 and 820-4 is established. After this, a peer-to-peer communication is performed between these communication terminal interface 820-1 and 820-4 (see step S18 in FIG. 10).

As described above, the communication network according to the present embodiment can perform a communication of connection request. Therefore, bandwidth use efficiency can be raised, and so, a cost of network can be reduced.

According to the first and second embodiment described above, the present invention is explained by taking a example in which the invention is applied to a LAN, however the present invention can be applied to other networks which can use a code division multiplexing. In addition, the present invention can be applied not only to a network which use optical signals but to a network which use electrical signals.

What is claimed is:

1. A communication network using code division multiplexing technology, comprising:
   a plurality of communication terminal interfaces, each of which has a first decoding circuit for decoding a received data using a first defusing code that is different for every communication terminal interface, a second decoding circuit for decoding a transmission control signal using a second spreading code that is common to each communication terminal interface, a packet control circuit for deciding whether a decoded signal is a data signal or the transmission control signal, and an encoding circuit for encoding a data signal using said first defusing code and encoding the transmission control signal using said second spreading code, and a communication circuit which connects said communication terminal interfaces to each other, wherein said packet control circuit decides the destination address of the transmission control signal when it has been received by a particular one of said communication terminal interfaces, and generates a response signal indicating permission/refusal of the connection in the case where the destination address is the address of said particular one of the communication terminal interfaces, and wherein said encoding circuit encodes said response signal and transmits it.

2. The communication network according to claim 1, wherein, when a data communication is performed between a first one of said communication terminal interfaces on a transmission side and a second one of said communication interfaces on a reception side, the first one of the communication terminal interfaces encodes data using the first spreading code which corresponds to the second one of the communication terminal interfaces.

3. The communication network according to claim 1, wherein the data communication is peer-to-peer communication.

4. The communication network according to claim 1, wherein each communication terminal interface further comprises:

synchronization control circuit which reads signals from said first and second decoding circuits synchronized with timing signals, and a decision circuit which transforms the signals read by said synchronization control circuit to binary data.

5. The communication network according to claim 1, wherein said control signal is a connection request signal for requesting communication connection to a particular one of said communication terminal interfaces.

6. The communication network according to claim 1, wherein said encoding circuit encodes said response signal using said second spreading code.

7. The communication network according to claim 1, wherein said packet control circuit performs no process in the case where the destination address is not the address of said particular one of said communication terminal interfaces.

8. The communication network according to claim 1, wherein each communication terminal interface comprises a optical module which transforms the received signal from an optical signal to an electrical signal and transforms the transmission signal from an electrical signal to an optical signal.

9. The communication network according to claim 1, wherein the terminal interfaces broadcast connection requests to other terminals.

* * * * *